United States Patent

Pournain et al.

(10) Patent No.: US 6,430,502 B1
(45) Date of Patent: Aug. 6, 2002

(54) MOTOR VEHICLE NAVIGATION SYSTEM

(75) Inventors: Michel Pournain, Leguevin; Robert Lopez, Toulouse; Gilles Cros, Leguevin, all of (FR)

(73) Assignee: Siemens VDO Automotive, Toulouse (FR)

( * ) Notice: Subject to any disclaimer, the term of this patent is extended or adjusted under 35 U.S.C. 154(b) by 0 days.

(21) Appl. No.: 09/485,808

(22) PCT Filed: Jul. 30, 1998

(86) PCT No.: PCT/EP98/04774

§ 371 (c)(1),
(2), (4) Date: Feb. 14, 2000

(87) PCT Pub. No.: WO99/08250

PCT Pub. Date: Feb. 18, 1999

(30) Foreign Application Priority Data

Aug. 12, 1997 (FR) .................................................. 10294

(51) Int. Cl.⁷ .............................................. G01C 21/34
(52) U.S. Cl. ....................... 701/211; 701/207; 340/990; 340/995
(58) Field of Search ................................ 701/207, 208, 701/209, 211, 212; 340/988, 990, 995

(56) References Cited

U.S. PATENT DOCUMENTS

| | | | | |
|---|---|---|---|---|
| 4,608,656 A | * | 8/1986 | Tanaka et al. | 701/212 |
| 5,031,104 A | * | 7/1991 | Ikeda et al. | 701/209 |
| 5,212,643 A | * | 5/1993 | Yoshida | 701/212 |
| 5,410,486 A | * | 4/1995 | Kishi et al. | 701/211 |
| 5,422,812 A | * | 6/1995 | Knoll et al. | 340/995 |
| 5,544,060 A | | 8/1996 | Fujii et al. | 340/990 |
| 5,774,071 A | * | 6/1998 | Konishi et al. | 701/211 |
| 5,850,618 A | * | 12/1998 | Suetsugu et al. | 701/211 |
| 5,864,305 A | * | 1/1999 | Rosenquist | 701/212 |
| 6,144,920 A | * | 11/2000 | Mikame | 701/212 |
| 6,182,010 B1 | * | 1/2001 | Berstis | 701/211 |
| 6,219,614 B1 | * | 4/2001 | Uchigaki et al. | 701/211 |

FOREIGN PATENT DOCUMENTS

| | | |
|---|---|---|
| DE | 3905493 A1 | 8/1990 |
| EP | 0534533 A1 | 3/1993 |

* cited by examiner

Primary Examiner—Gary Chin
(74) Attorney, Agent, or Firm—Laurence A. Greenberg; Werner H. Stemer; Gregory L. Mayback

(57) ABSTRACT

The present invention relates to a motor vehicle navigation method and system (10). More specifically, this system comprises a central navigation computation unit (11) equipped with a memory (12) containing the topography of a predetermined zone, and a device (13) for locating the vehicle. The central unit (11) is associated with a voice-guidance device (15) and a screen (14) operating in a mode known as "normal guidance" mode, in which at least one direction pictogram is displayed on the screen to indicate the major maneuvers which have presently to be reproduced by the driver. The system according to the invention is characterized in that it comprises a control (16) designed to make the voice-guidance device (15) and/or the screen (14) operate in a temporarily enhanced guidance mode, in which at least one voice message and/or one direction pictogram reproduces the topography, as stored, of the area for which enhanced guidance has been requested, said enhanced guidance pictogram and/or the associated voice message being obtained by temporary modification of the filtering applied to the stored topographical data.

9 Claims, 2 Drawing Sheets

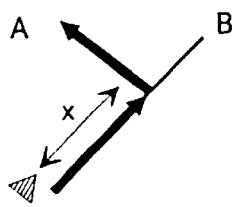
Figure 2a
| Normal guidance | Enhanced guidance |
|---|---|
| ~ 14 ~ ↑ | ~ 14 ~ ↰ |
| No message | Turn left in x meters |
Figure 2b
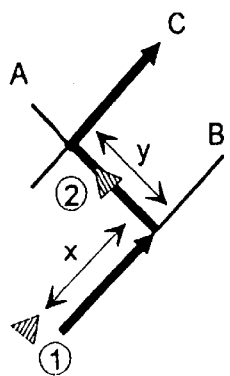
Figure 3a
| Normal guidance | Enhanced guidance |
|---|---|
| ~ 14 ~ ⊢→ | ~ 14 ~ ↰  ↱ y |
| Turn right (x+y) meters | Turn left in x meters then turn right |
Figure 3b
| Normal guidance | Enhanced guidance |
|---|---|
| ~ 14 ~ ⊢→ | ~ 14 ~ ⊢→ |
| Turn right in y meters | Turn right in y meters |
Figure 3c

MOTOR VEHICLE NAVIGATION SYSTEM

BACKGROUND OF THE INVENTION

Field of the Invention

The present invention relates to a motor vehicle navigation method and system. More specifically, the system according to the invention is intended to assist with the travel of a vehicle through a predetermined geographical zone.

Navigation systems which allow a driver to navigate through a predetermined zone are already known. These systems display on a screen the major maneuvers that have to be performed in order to reach an objective set by the driver. In general, such systems operate as follows:

- the driver initially defines an objective to be reached,
- the system calculates and establishes a favored route for reaching it, and
- the system guides the driver step by step until this objective is reached.

Guidance is performed using voice messages and/or a screen placed on the vehicle dashboard. Conventionally, the screen displays directional pictograms indicating to the driver the major maneuvers that he has to reproduce in order to reach the set objective.

Document DE 39 05 493 (BOSCH) describes a navigation system which displays a detailed road map on a screen on board the vehicle. However, this road map is difficult to consult quickly when a decision as to which direction to take is needed. According to that patent, the driver then has the option of requesting simplified guidance. This simplified guidance gives him a direction indication of the type shown on road signs, instead of the detailed road map. The purpose of such simplified guidance is to assist the driver in quickly making a decision. However, this guidance does not reflect the actual topography of the area because the road infrastructure is depicted symbolically. Thus, for example, if the driver needs to follow a main road which turns to the right, the simplified display will display "continue straight on", because what is needed is to continue following the main road. This may of course cause the driver to make a mistake or at the very least may trouble him. The simplified guidance mode according to that patent is unable to resolve such directional ambiguities.

Likewise, document U.S. Pat. No. 5,544,060 (ZEXEL) describes a navigation system equipped with a preview function. Such a system, in addition to the conventional display of a direction indication, allows the display of all the direction indications that will be given to the driver during the journey he has to make to be requested at any moment on the journey. This preview function does not, however, give the driver any additional information when he does not understand a direction indication asking him to continue straight on (because he needs to follow the main road) when the road before him is turning. Such a navigation system does not allow the ambiguity felt by the driver in such a scenario to be removed.

Now, this scenario (a divergence between an indication given by the navigation system and the actual layout of the area as seen by the driver) occurs fairly often. This is because the mapping available commercially at the present time is often incomplete, or even incorrect, both in built-up areas and in rural areas. In built-up areas, the errors are mainly due to new roads which are not shown on the maps, or to modifications to the traffic plan. In rural areas, not all of the secondary roads are shown on the map and the risk of error is therefore great. The indications given by the screen may sometimes cause the driver to make a mistake. Thus, as was explained earlier, when the main road turns to the right or to the left, the navigation system depicts the direction to be taken as a "straight on" indication. This is because, as far as the system is concerned, as it is still the main road that has to be followed, it is the "straight on" direction that has to be taken. If, through ill fortune, in the bend in the main road, there is a road leading "straight on" which is either not on the map or looks to be of the same order of importance even thought it has been mapped with a lower order of importance, there is the risk that the driver will take the wrong direction. Such mapping errors and/or guidance anomalies are relatively frequent.

In order to alleviate this type of fault, it is already known practice, when the driver requests it, for the navigation device screen to display not only guidance pictograms indicating the major changes in direction to be taken, but the stored map of the point at which the vehicle is located. However, for the screen to be able to display such a map it has to be large enough and have a high resolution. A screen of this type is therefore relatively expensive. Furthermore, this solution has the major drawback of requiring the driver to analyze a map while he is driving, which may be prejudicial to safety or require him to stop the vehicle, still for safety reasons.

SUMMARY OF THE INVENTION

The present invention proposes a motor vehicle navigation system which easily guides a driver when he detects an ambiguity and does so without presenting a detailed map on the screen and without requiring the driver to have to interpret such a map.

To this end, the present invention relates to a motor vehicle navigation system, of the type comprising:

- a central navigation computation unit equipped with a memory containing actual topographical data of a predetermined zone, and
- a device for locating the vehicle, the central unit being associated with a voice-guidance device and/or with a screen operating in a mode known as "normal guidance" mode, in which at least one direction pictogram is displayed on the screen to indicate the major maneuvers which have presently to be reproduced by the driver, said system being characterized in that it further comprises:
- a control designed to make the voice-guidance device and/or the screen operate in a temporarily enhanced guidance mode, in which at least one voice message and/or one direction pictogram reproduces the topography, as stored, of the area for which enhanced guidance has been requested, said enhanced guidance pictogram and/or the associated voice message being obtained by temporary modification of the filtering applied to the stored topographical data.

A system of this kind therefore allows the driver to have before him a simplified form of the map depicting the topography of the area on the screen. This map displays only pictograms reproducing the stored geographical configuration of the road infrastructure at the predetermined point. This actual geometric configuration may possibly be simplified slightly, but not interpreted. Thus a bend to the right by 15.5° (for example) will not necessarily be depicted exactly by an arrow to the right inclined by 15.5°, but the bend to the right will be shown. In contrast, this same bend to the right will not be interpreted as having to be shown by a "straight on" arrow, under the pretext that it is the main road which is turning to the right.

Thus, if a main road turns to the right whereas the voice-synthesis device and the normal guidance display indicates to continue straight on, the enhanced guidance mode announces that the main road turns and presents a pictogram reproducing the direction of this road as stored in memory. By virtue of the enhanced guidance requested by the driver, the ambiguity is removed and the driver knows that the main road turns, which allows him to continue in the right direction.

This enhanced guidance is displayed on the screen by a temporary modification to the filtering of the data that is to be displayed. This modification to the filtering is limited in space and/or in time.

Advantageously, according to the invention, the control which allows the driver to request temporary enhanced guidance may be a push-button placed as close as possible to the driver or be a device controlled by voice or any other similar means.

It will also be noted that the enhanced guidance requested ceases automatically as soon as the vehicle has performed the maneuver indicated by the pictogram.

The end of enhanced guidance mode may also be automated by a time delay and occur when a certain amount of time has elapsed.

The present invention also relates to a navigation method which employs the above-described device.

Further objects, features and advantages of the present invention will in any event emerge from the description which follows by way of nonlimiting example and with reference to the appended drawings, in which:

BRIEF DESCRIPTION OF THE DRAWINGS

FIGS. 2a and 2b depict enhanced guidance according to the invention, in a first scenario of road infrastructure configuration, FIGS. 3a to 3c depict enhanced guidance according to the invention in a second scenario of road infrastructure configuration.

DESCRIPTION OF THE PREFERRED EMBODIMENT

Figure 1:
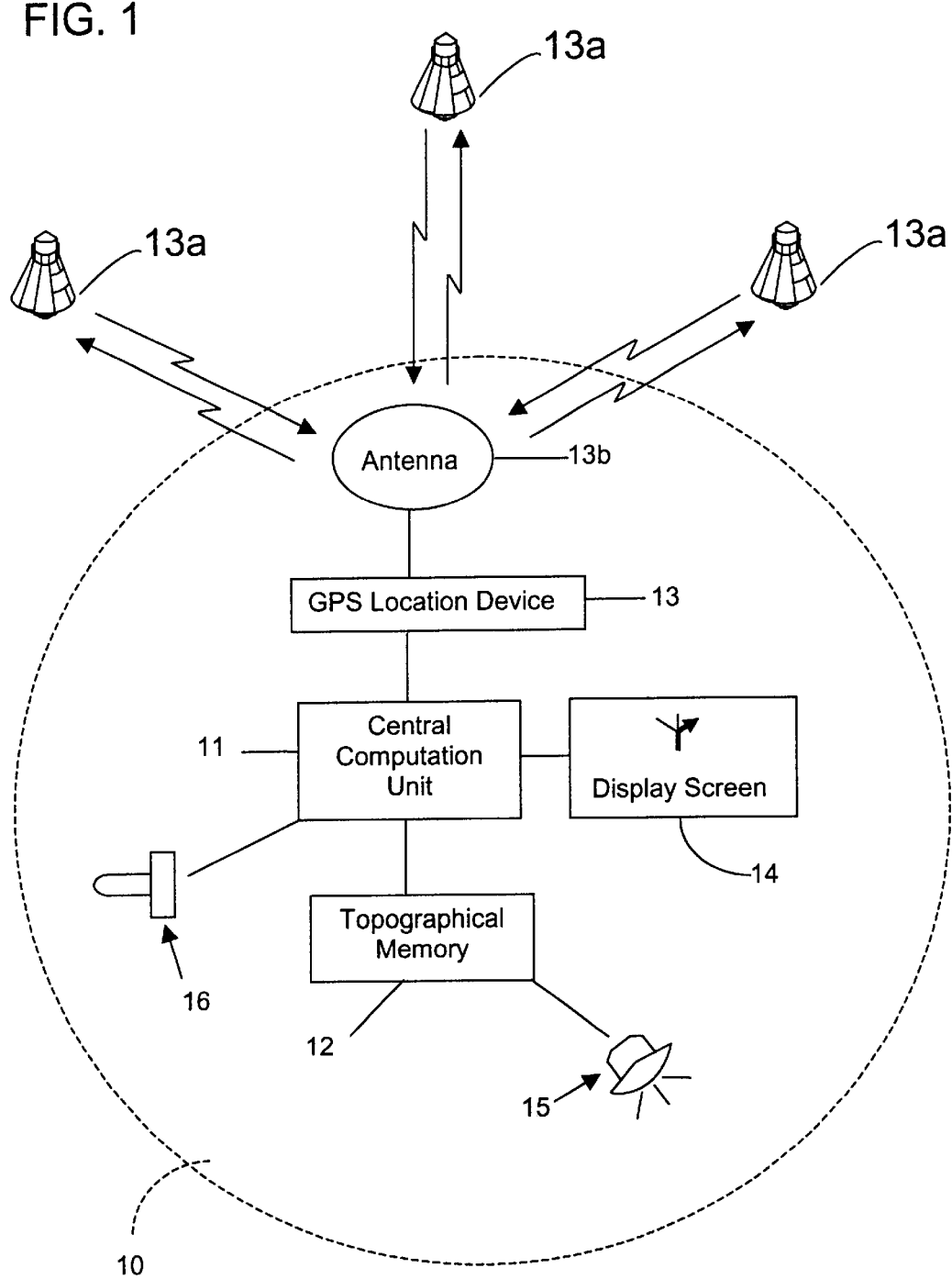
FIG. 1 diagrammatically depicts a navigation system according to the invention.

According to the embodiment depicted in FIG. 1, the navigation system 10 according to the invention is fitted on board a motor vehicle and is designed to provide the driver with assistance regarding the route to be taken in order to reach a preset objective.

This navigation system comprises, in the conventional way, a central computation unit 11 connected to a topographical memory 12 containing the topographical data of a predetermined area. The central computation unit 11 is also connected to a GPS (global positioning system) positioning device 13 associated, in the conventional way, with a number of positioning satellites 13a. The central computation unit 11 is also connected to a voice-synthesis device 15 designed to emit a voice message to the driver. A display screen 14, also connected to the central unit, presents on the screen at least one direction pictogram indicating the major maneuvers that have presently to be reproduced by the driver. According to the invention, this navigation system also comprises a control 16, depicted in FIG. 1 in the form of a simple push-button, which can be actuated by the driver and is placed near to him for this purpose.

In the conventional way, the satellites 13a send out, to an antenna 13b of the positioning device 13, signals which allow the positioning device 13 and the central computation unit 11 to determine the co-ordinates of the vehicle. Depending on the route established by this central computation unit, the latter then displays on the screen, according to the determined position of the vehicle, what the major maneuvers are that have shortly to be performed. For example, it indicates to the driver that he will have to turn right in x meters and, in this case, the pictogram depicted on the screen indicates a maneuver to the right as depicted in FIG. 1 and the voice-synthesis device 15 announces the corresponding message.

Note that the navigation system 10 announces and displays only the next major changes in direction. Thus, in normal guidance mode, to avoid the driver having to be disturbed by an excessive amount of information, the navigation system 10 transmits to the driver only filtered messages (voice and visual). This filtering is very useful, but there are certain situations in which the driver may have problems in following the indication presented on the screen or which he has heard. In this case, according to the invention, the driver presses the push-button 16 to switch the navigation system into enhanced guidance mode. In this case, the central computation unit 11, after making a comparison between the normal guidance and the enhanced guidance modes, authorizes the switch to enhanced guidance mode when there is a difference between these modes of guidance. The enhanced guidance according to the invention consists in a temporary modification to the filtering applied to the stored topographical data.

Two scenarios in which this enhanced guidance may be needed are presented below.

With reference to FIG. 2a, the vehicle (shown as a hatched triangle) needs to follow a main road A which, after a distance of x meters, turns to the left. In this left-hand bend, a second road, referenced B in FIG. 2a, intersects with this main road. This road B has not been mapped (for whatever reason) and does not therefore exist in the stored map.

When the vehicle is in normal guidance mode the screen 14 indicates, by way of a direction that the driver is to take, a vertical pictogram simply informing him to continue "straight on", that is to say to continue along the main road. Incidentally there is no voice message associated with this type of guidance and the voice synthesiser 15 remains silent.

The driver, arriving in sight of the intersection of the roads A and B, detects a guidance ambiguity. This being the case, he presses the push-button 16 to request enhanced guidance. The central computation unit 11 authorizes this enhanced guidance and presents, as shown in FIG. 2b, a pictogram indicating the actual topography of the area in which the vehicle is located, this pictogram presenting the stored direction to be followed. What really happens is that the switch to enhanced guidance mode has the effect of modifying the filtration of the information from the stored map and of allowing the information to be presented as stored, without interpreting it.

As shown in FIG. 2b, the enhanced guidance mode therefore presents a pictogram turning to the left. In this enhanced guidance mode, the road B is not depicted because it is not present in the map, but it is clearly shown that the road A turns to the left. The voice-synthesis device also clearly announces the need to turn left in x meters, even if this in fact involves following the main road. As soon as the driver has gone past the junction between road A and road B, the central computation unit 11 switches back into normal guidance mode.

It will thus be noted that the enhanced guidance allows the stored directions to be followed to be announced and presented temporarily on the screen, according to the topography of the area as stored, and without concern as to whether or not a road is a main road. The driver, thus informed, can take the correct direction and continue his journey.

FIGS. 3a to 3c present a second scenario in which the driver may call for enhanced guidance in order to be correctly guided. FIG. 3a shows the stored topography of the area. The route C that the driver has to follow is shown by bold pictograms. In this particular instance the driver has, starting from a position 1 (hatched triangle referenced 1) to follow a main road for a distance x and then go left for a distance y and, from a position 2, take path C on the right. However, between the distance x and the distance y he will cross an unmapped road B (or a road down which he is not permitted to turn), and when changing direction toward the right to take route C, he will arrive at a junction between a route A and a route C. This being the case, the normal guidance mode of the vehicle presents, as shown in FIG. 3b, an indication (voice and visual) indicating that he will need to turn right in a distance x+y.

Quite obviously, the driver receiving this type of information will immediately realize that this does not correspond to what he is seeing. This being the case, he may press the control 16 to request enhanced guidance. This enhanced guidance first of all, as regards the junction between path C and road B, will allow confirmation of the fact that the main road turns to the left. The enhanced guidance therefore presents a pictogram turning to the left (FIG. 3b) and the voice synthesizer 15 indicates to the driver that in x meters he will have to turn left, then right toward C.

It will be noted that the visual information is supplied in two stages. In a first stage, as in the previous example, the road B is not depicted on the screen but the bend in the road C is shown (FIG. 3b). Furthermore, the indication that he will then have to turn right is announced and presented on the screen by a pictogram to the right with an indication (y) corresponding to the distance he will have to have covered between the two maneuvers. The voice-synthesis device therefore informs him that he will have to turn left in x meters but that afterwards he will also have to turn right.

In a second stage (shown by a hatched triangle referenced 2), as soon as the vehicle has gone past the junction with the road B, the normal guidance and the enhanced guidance of the vehicle indicate that he needs to turn right in y meters (FIG. 3c).

The two examples (FIGS. 2a, 2b and 3a to 3c) of anomalies presented hereinabove have been given merely by way of indication. A great many other potential anomalies exist. These examples have been given merely to demonstrate the benefit of switching to enhanced guidance mode according to the invention.

The switch to enhanced guidance mode according to the invention therefore allows the driver to be guided appropriately, particularly when a new road has been built, when a "no entry" has been removed, when a main road with a certain number of turns intersects secondary roads (which may or may not be mapped). Thus, as soon as a journey contains a certain number of ambiguities, the driver has the opportunity of requesting additional information regarding each of these ambiguities.

The enhanced guidance mode according to the invention announces and displays, temporarily and in a simplified fashion the as-stored topography of the area in which the ambiguity has arisen. In fact, the enhanced guidance mode according to the invention modifies the filtering usually employed in normal guidance mode and presents the driver with all the necessary information at his disposal. It is the driver who then alone removes the ambiguity by recognizing the location and by using the enhanced guidance indications. These indications do, however, remain brief and do not require sustained analysis on the part of the driver in interpreting a map. Unlike that which has hitherto been the practice in motor vehicle navigation systems, it is therefore no longer a complete map which is presented to the driver in order to remove an ambiguity. The driver can thus more quickly and more easily analyze the maneuvers he has to reproduce, and incidentally in most cases, the voice-guidance message alone suffices. The driver therefore does not even have to consult the display screen. According to an alternative embodiment of the present invention, the navigation-aid device uses only a voice-guidance device 15.

It will be noted that only a portion of the route ahead of the vehicle is analyzed. The distance thus analyzed is compatible with the possibility of the driver visually detecting an ambiguity, and therefore depends on the speed at which the vehicle is traveling, and also on the class of roadway followed.

The present invention also relates to a navigation method which consists in displaying on a screen 14 pictograms which indicate the major maneuvers which have to be reproduced by the driver and/or in giving, using a voice-guidance device 15, the corresponding instructions, in accordance with a first type of filtering known as "normal guidance", said method being characterized in that it further consists, when an ambiguity is detected, in:

modifying the first filtering, temporarily, so as to switch into an "enhanced guidance" mode, in which the necessary information contained in the stored topography is delivered to the driver using a second type of filtering.

It will be noted that modifying the first filtering consists in temporarily reducing the degree of filtering applied to the topographical data as stored. Thus, the second filtering filters the road information to a lesser extent than the first. It allows "raw" information to be transmitted to the driver, which information does not, for example, take account of the fact that a road is a main road, and any stored direction change is indicated. In this second filtering mode (which may, at the extreme, be an absence of filtering) any intersection with a road of the same or of lesser importance is signaled, etc.

This second filtering mode is not intended to solve a detected ambiguity by itself but provides the driver with all the information available regarding this ambiguity, so as to allow the driver to remove this ambiguity.

Of course, the present invention is not limited to the embodiments described hereinabove. It will be noted in particular that the control designed to make the navigation system operate in temporary enhanced guidance mode may be a push-button 16 as described earlier or alternatively may be a voice-controlled device. Likewise, the enhanced guidance mode may revert of its own accord to normal guidance mode when the ambiguity has disappeared or alternatively this switch back to normal guidance mode may occur after a predetermined time has elapsed.

It is the central computation unit 11 which, following actuation of the control 16 by the driver, compares the indications given by the normal guidance mode and the indications that the enhanced guidance mode could give. When there is a difference between the indication given by the normal guidance mode and the stored topography of the area according to the enhanced guidance mode, then the central computation unit 11 authorizes the switch to enhanced guidance mode. By contrast, as soon as the central computation unit 11 no longer perceives any difference between the normal guidance mode and the enhanced guidance mode, it causes the navigation system 14 to switch back to normal guidance mode. This switch to normal guidance mode may also be delayed for a certain length of time even if there are no differences between the normal guidance and the enhanced guidance modes.

What is claimed is:

1. A motor vehicle navigation system, comprising:
   a central navigation computation unit equipped with a memory storing topographical data representing an actual topography of a predetermined zone;
   a device for locating a vehicle in which said central navigation computation unit is disposed;
   a user interface device selected from the group consisting of a voice guidance device and a screen connected to said central navigation computation unit and operating in a "normal guidance" mode, wherein a direction pictogram is displayed on the screen to indicate major maneuvers to be reproduced by an operator of the vehicle;
   a control device for causing said user interface device to operate in a temporarily enhanced guidance mode, wherein said user interface device represents the topography, as stored in said memory, of an area for which enhanced guidance has been requested, obtained by temporary modifications of a filtering applied to the stored topographical data.

2. The navigation system according to claim 1, wherein said user interface device, in the enhanced guidance mode, produces at least one message selected from the group consisting of a voice message and a direction pictogram reproducing the topography with a filtering varied relative to a filtering during the normal guidance mode.

3. The navigation system according to claim 1, wherein said central computation unit is programmed, after an actuation of said control device, to authorize switching to said enhanced guidance mode if there is a difference between a direction indicated by the said normal guidance mode and the stored topography of the area.

4. The navigation system according to claim 1, wherein said central computation unit is programmed to switch the navigation system back to said normal guidance mode when the vehicle has passed the point for which said enhanced guidance was requested.

5. The navigation system according to claim 1, wherein said control device is associated with a time delay and said central computation unit is programmed to switch the navigation system back to said normal guidance mode after a predetermined time has elapsed since the system switched to said enhanced guidance mode.

6. The navigation system according to claim 1, wherein said control device is a push-button placed near a steering wheel of the vehicle.

7. The navigation system according to claim 1, wherein said control device is a voice-activated control device.

8. A navigation method performed with the navigation system according to claim 1, the method which comprises:
   filtering the data representing the topography in said "normal guidance" mode and selectively:
      displaying on the screen pictograms indicating the major maneuvers to be performed by the operator of the vehicle; and
      issuing corresponding guidance instructions with a voice-guidance device;
   when an operator of the vehicle detects an ambiguity:
      modifying the filtering, temporarily, to switch into said "enhanced guidance" mode, in which the information contained in the stored topography is delivered to the driver using a second type of filtering.

9. The method according to claim 8, wherein the modifying step comprises reducing a degree of filtering.

* * * * *